(12) United States Patent
Suzuki (10) Patent No.: US 10,701,041 B2
(45) Date of Patent: Jun. 30, 2020

(54) CALCULATION DEVICE, CALCULATION METHOD, COMMUNICATION APPARATUS, AND STORAGE MEDIUM

(71) Applicant: CANON KABUSHIKI KAISHA, Tokyo (JP)

(72) Inventor: Motoharu Suzuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 583 days.

(21) Appl. No.: 15/370,925

(22) Filed: Dec. 6, 2016

(65) Prior Publication Data
US 2017/0171167 A1    Jun. 15, 2017

(30) Foreign Application Priority Data
Dec. 11, 2015   (JP) ................................ 2015-242644

(51) Int. Cl.
H04L 29/06    (2006.01)
G06F 11/10    (2006.01)
G06F 3/06    (2006.01)

(52) U.S. Cl.
CPC .......... *H04L 63/0428* (2013.01); *G06F 3/067* (2013.01); *G06F 3/0623* (2013.01);
(Continued)

(58) Field of Classification Search
CPC ... H04L 63/0428; H04L 69/16; G06F 3/0623; G06F 3/0647; G06F 3/067; G06F 11/00
See application file for complete search history.

(56) References Cited

U.S. PATENT DOCUMENTS 6,345,302 B1 *   2/2002   Bennett ................... H04L 29/06
                                                  709/230
6,907,466 B2 *   6/2005   Alexander, Jr. ......... H04L 29/06
                                                  370/230
(Continued)

FOREIGN PATENT DOCUMENTS

JP          6-78024 A     3/1994
JP       2006-303765 A   11/2006

OTHER PUBLICATIONS

R. A. Maclean and S. E. Barvick, "An outboard processor for high performance implementation of transport layer protocols," IEEE Global Telecommunications Conference GLOBECOM '91: Countdown to the New Millennium. Conference Record, Phoenix, AZ, USA, 1991, pp. 1728-1732 vol. 3. (Year: 1991).*

(Continued)

*Primary Examiner* — Jung W Kim
*Assistant Examiner* — Sameera Wickramasuriya
(74) *Attorney, Agent, or Firm* — Canon U.S.A., Inc. IP Division (57) ABSTRACT

A calculation device that performs checksum calculation on data to be communicated includes a plurality of memories, an interface configured to output data to which a checksum is added, a first transmitter configured to transmit the data between the plurality of memories and have a function of performing the checksum calculation on the data, a second transmitter configured to transmit the data between one of the plurality of memories and the interface and have a function of performing the checksum calculation on the data, and a control unit configured to control operation of the first transmitter and the second transmitter. The control unit causes the first transmitter or the second transmitter to perform the checksum calculation based on a communication method employed for the data.

4 Claims, 8 Drawing Sheets

(52) U.S. Cl.
CPC ........ *G06F 3/0647* (2013.01); *G06F 11/1004* (2013.01); *H04L 69/16* (2013.01)

(56) References Cited

U.S. PATENT DOCUMENTS

| | | | | |
|---|---|---|---|---|
| 6,963,946 B1* | 11/2005 | Dwork | .................... | G06F 13/28 709/213 |
| 7,188,250 B1* | 3/2007 | Alfieri | ....................... | H04L 9/06 713/161 |
| 7,502,474 B2* | 3/2009 | Kaniz | ..................... | H04L 49/90 380/255 |
| 9,130,957 B2* | 9/2015 | Yamaura | ........... | H04L 29/12028 |
| 2005/0083917 A1* | 4/2005 | Okamoto | ................ | H04L 29/06 370/352 |
| 2005/0198531 A1* | 9/2005 | Kaniz | ................. | H04L 63/0485 726/5 |
| 2005/0232161 A1* | 10/2005 | Maufer | ................ | H04L 63/062 370/252 |
| 2008/0052511 A1* | 2/2008 | Fascenda | ............ | H04L 63/0428 713/160 |
| 2008/0104162 A1* | 5/2008 | Suzuki | .................. | H04L 1/0061 708/530 |
| 2008/0133798 A1* | 6/2008 | Park | ....................... | H04L 47/193 710/54 |
| 2009/0225757 A1* | 9/2009 | Imao | ........................ | H04L 69/16 370/392 |
| 2010/0058155 A1* | 3/2010 | Wu | ........................ | H04L 1/0061 714/807 |
| 2014/0071971 A1* | 3/2014 | Kojima | ................. | H04W 40/02 370/338 |
| 2015/0256654 A1* | 9/2015 | Oguchi | .................. | H04L 69/08 709/230 |
| 2015/0301886 A1* | 10/2015 | Watanabe | ............. | G06F 3/0619 714/807 |

OTHER PUBLICATIONS

Shafer, Jeffrey, and Scott Rixner. "A reconfigurable and programmable gigabit ethernet network interface card." Network 1.2 (2006): 3. (Year: 2006).*

* cited by examiner

CALCULATION DEVICE, CALCULATION METHOD, COMMUNICATION APPARATUS, AND STORAGE MEDIUM

BACKGROUND OF THE INVENTION

Field of the Invention

An aspect of the embodiments relates to a calculation device, a calculation method, a communication apparatus, and a storage medium and more particularly to a technique for efficiently performing checksum calculation.

Description of the Related Art

In a communication field, checksum calculation might be necessary. A checksum is information used to detect an error. In transmission control protocol (TCP) checksum calculation during TCP/Internet protocol (IP) communication, which is widely used for the Internet today, all payload data in TCP packets are to be calculated. Regardless of whether the TCP checksum calculation is performed by a central processing unit (CPU) based on a computer program or by hardware, all the payload data are to be transmitted to a calculation unit.

In Japanese Patent Laid-Open No. 6-78024, a configuration relating to a network adapter capable of performing checksum calculation is described. With the configuration, checksum unprocessed packets stored in a storage device and checksum control information are transmitted to the network adapter. The network adapter performs checksum calculation on the checksum unprocessed packets on the basis of the checksum control information and transmits complete packets to an interface and then to a network.

In Japanese Patent Laid-Open No. 2006-303765, hardware achieves IP checksums and TCP checksums in transmission of TCP/IP packets. With this configuration, checksum calculation is performed while the TCP/IP packets are being transmitted from a direct memory access (DMA) processing unit to a media access control (MAC) bridge circuit.

A transmitter that reads checksum unprocessed packets from a memory, performs checksum calculation, and transmits complete packets to an interface has the following functions:

(1) a process for reading the checksum unprocessed packets from the memory;
(2) a process for analyzing headers of the checksum unprocessed packets;
(3) a process for calculating checksums on the basis of results of the analysis;
(4) a process for overwriting the checksum unprocessed packets with results of the checksum calculation; and
(5) a process for transmitting complete packets obtained as a result of the overwriting process to the interface.

Transmission of data on which the transmitter having the above functions has performed checksum calculation poses the following two situations.

The first situation arises from characteristics of communication in which checksums are used. A checksum is added to a header, that is, at a top, of each packet. If checksum calculation is to be performed up to an end of a packet, therefore, data from a position at which a checksum is to be written to the end of the packet is to be temporarily stored in the transmitter. This means that when the transmitter performs checksum calculation on a packet larger than maximum transmission unit (MTU) size, the transmitter would have a large buffer, which is costly.

The second situation arises when encrypted communication is performed. If packets prepared in the memory are encrypted packets, headers to be analyzed and data to be calculated might also be encrypted. In this case, even if a communication protocol that requires checksum calculation is employed, the transmitter might not be able to correctly perform checksum calculation between the memory and the interface. If the transmitter performs checksum calculation, the packets might be destroyed.

The present invention provides a technique for efficiently performing checksum calculation in various communication methods.

SUMMARY OF THE INVENTION

The aspects of the embodiments provide a calculation device that performs checksum calculation on data to be transmitted. The calculation device includes a plurality of memories, an interface configured to output data to which a checksum is added, a first transmitter configured to transmit the data between the plurality of memories and have a function of performing the checksum calculation on the data, a second transmitter configured to transmit the data between one of the plurality of memories and the interface and have a function of performing the checksum calculation on the data, and a control unit configured to control operation of the first transmitter and the second transmitter. The control unit causes the first transmitter or the second transmitter to perform the checksum calculation based on a communication method employed for the data.

Further features of an aspect of the embodiments will become apparent from the following description of exemplary embodiments with reference to the attached drawings.

DESCRIPTION OF THE EMBODIMENTS

Aspect of the embodiments will be described in detail hereinafter with reference to the accompanying drawings.

First Embodiment

Communication Apparatus

Figure 1:
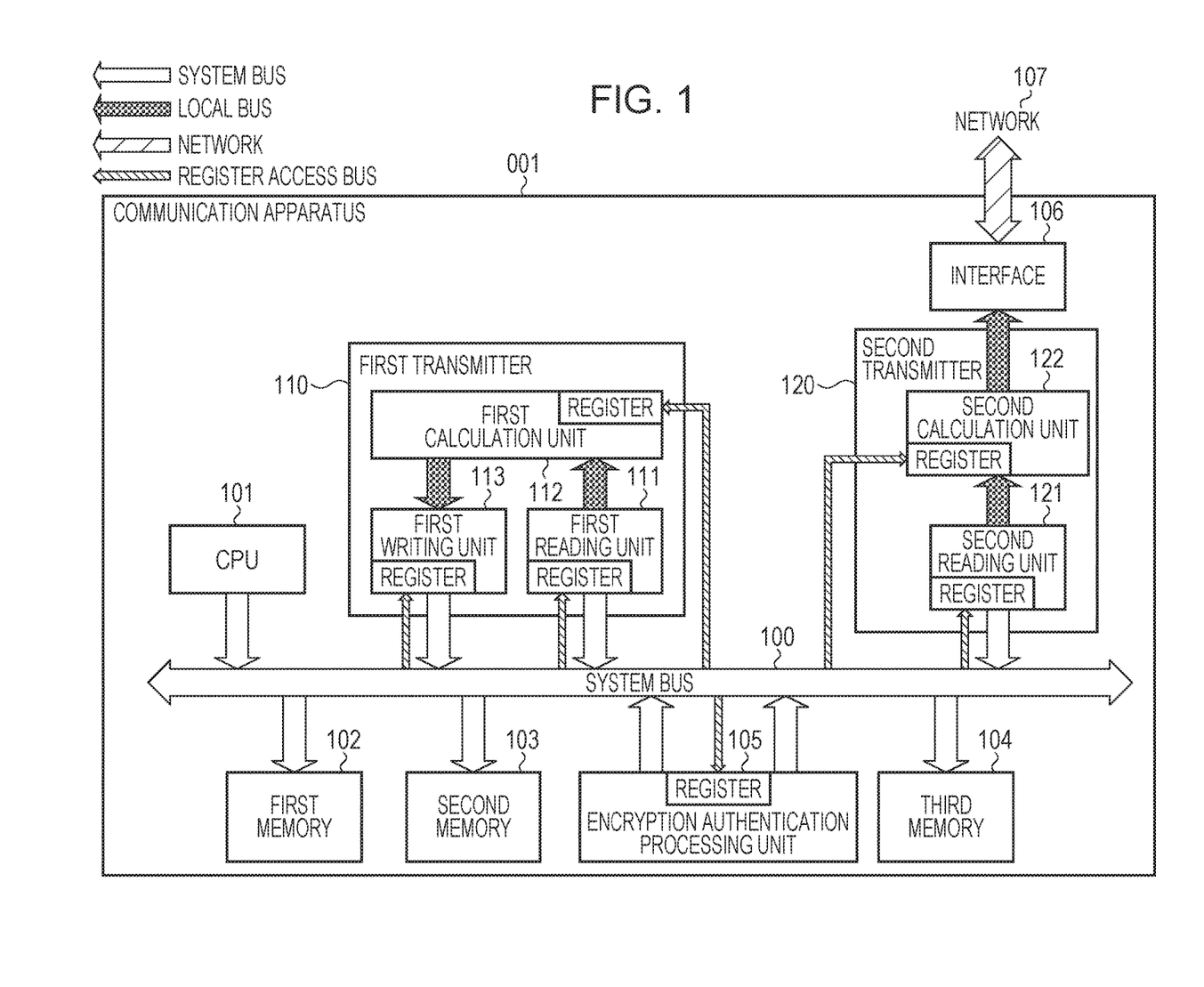
FIG. 1 is a block diagram illustrating the configuration of a communication apparatus.

An aspect of the embodiments (first embodiment) will be described hereinafter. FIG. 1 is a block diagram illustrating the configuration of a communication apparatus 001 according to the present embodiment. Seven modules, namely a CPU 101, a first memory 102, a second memory 103, a third memory 104, an encryption authentication processing unit 105, a first transmitter 110, and a second transmitter 120, are connected to a system bus 100 of the communication apparatus 001.

The CPU 101 processes and controls the entirety of a communication process performed by the communication apparatus 001. More specifically, the CPU 101 performs protocol processing for achieving transmission control protocol (TCP) communication and controls various modules. The first memory 102, the second memory 103, and the third memory 104 store packet data communicated between a network 107 and the communication apparatus 001 and temporary data for the CPU 101 and the various modules to perform processing. The encryption authentication processing unit 105 performs encryption including a process for encrypting and authenticating packets. In the present embodiment, the encryption generically refers to various processes relating to safe data transmission, such as decryption of encrypted data and an authentication process, as well as encryption of data.

The first transmitter 110 performs DMA transmission in which at least one of the first to third memories 102 to 104 is a source and at least one of the memories 102 to 104 is a destination. The first transmitter 110 includes a first calculation unit 112, a first reading unit 111, and a first writing unit 113, each of which is provided with a register. The first calculation unit 112 is capable of performing checksum calculation on data subjected to the DMA transmission. The first reading unit 111 is used for reading data from the first to third memories 102 to 104 and the like and the first writing unit 113 is used for writing data to the first to third memories 102 to 104 and the like. The first transmitter 110 is an apparatus for transmitting data between the first to third memories 102 to 104 and has a function of performing checksum calculation on the data (checksum calculation function).

The second transmitter 120 performs DMA transmission between at least one of the first to third memories 102 to 104 and an interface 106. The second transmitter 120 includes a second calculation unit 122 and a second reading unit 121, each of which is provided with a register. The second calculation unit 122 can perform checksum calculation by setting data to be transmitted by the second transmitter 120 to the register of the second calculation unit 122 when the data is certain packets smaller than MTU size and has not been encrypted. The MTU size is 1,500 bytes in Ethernet. The second reading unit 121 is used for reading data from the first to third memories 102 to 104 and the like. The second transmitter 120 is an apparatus for transmitting data between the first to third memories 102 to 104 and the interface 106 and has a function of performing checksum calculation on the data.

The interface 106 is an interface between the communication apparatus 001 and the network 107. The interface 106 mainly performs processing in MAC and physical (PHY) layers to perform communication. As described later, the interface 106 outputs data to which checksums are added. The block diagram has been described.

Processing Procedure when Plain Text is Transmitted

Figure 2:
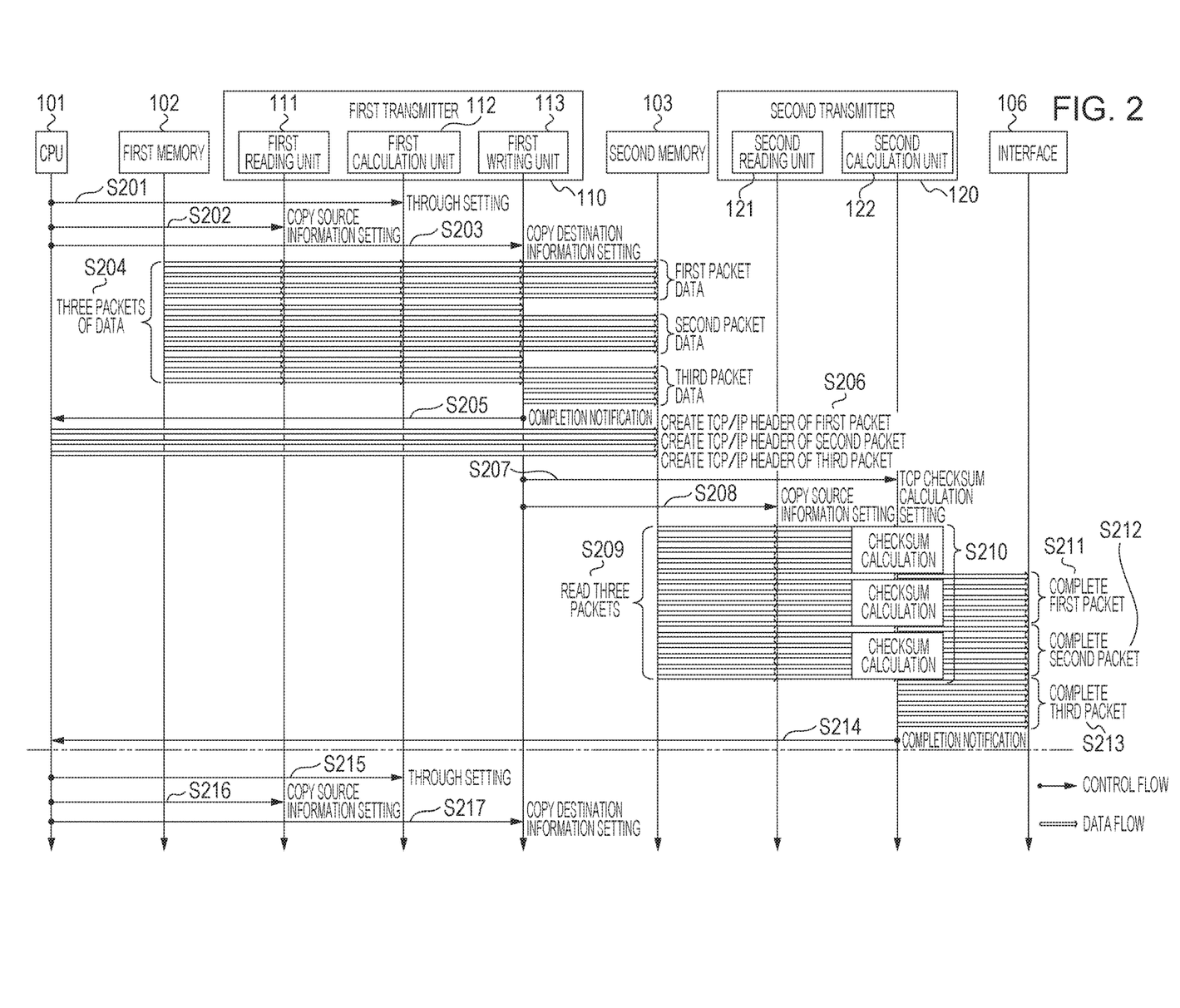
FIG. 2 is a diagram illustrating a process for transmitting TCP/IP packets (not encrypted).
Figure 3A:
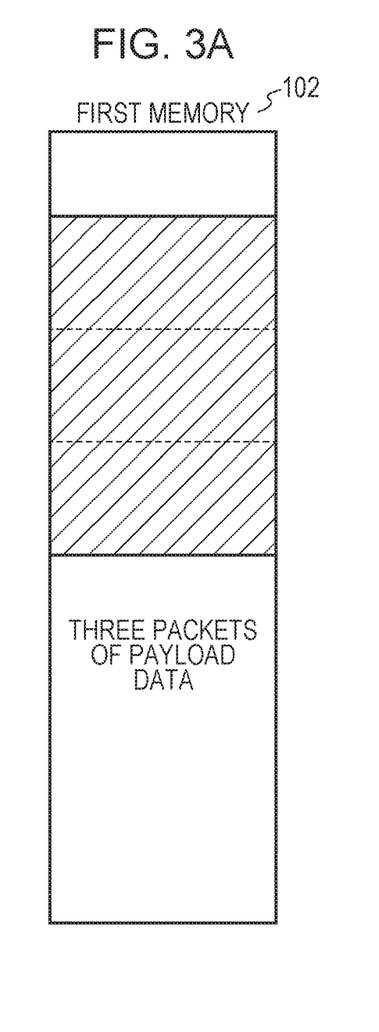
FIGS. 3A to 3C are diagrams illustrating data storage states of each memory in some steps.
Figures 3B, 3C:
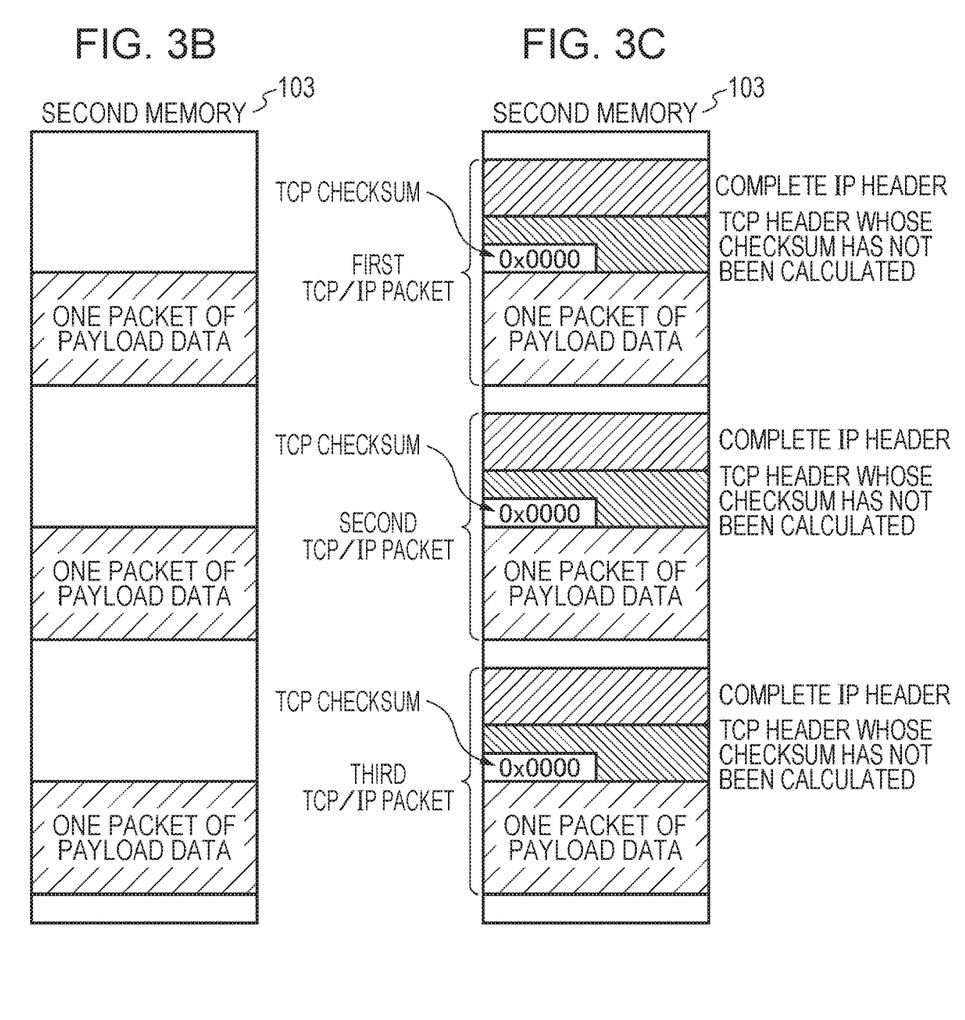

Next, an operational flow when the communication apparatus 001 transmits TCP/IP packets without encryption will be described with reference to FIG. 2. FIG. 2 is a sequence chart illustrating a processing procedure at a time when the communication apparatus 001 transmits plain text. A data storage state of each memory in some steps will be described with reference to FIGS. 3A to 3C. FIGS. 3A to 3C are diagrams illustrating use states of the first and second memories 102 and 103.

First, in 201 to S205, the CPU 101 copies a datagram stored in a user buffer in the first memory 102 to a work area secured in the second memory 103. The first transmitter 110 is used for the copying. If the packets are to be transmitted to the interface 106 without encryption, the second calculation unit 122 included in the second transmitter 120 can perform checksum calculation. That is, the first transmitter 110 need not perform the checksum calculation. "Checksum OFF" (through setting), therefore, is set to the first calculation unit 112 (S201). The CPU 101 makes the determination and the setting. Copy source information (here, addresses in the user buffer in the first memory 102 and transmission sizes) is then set to the first reading unit 111 (S202). Copy destination information (here, addresses in the work area in the second memory 103 and the transmission sizes) is then set to the first writing unit 113 (S203).

When the setting of the first reading unit 111 has been completed in 201 to S203, data transmission from the first memory 102 to the second memory 103 starts (S204). More specifically, in S204, data is sequentially transmitted from the first memory 102 to the first reading unit 111, the first calculation unit 112, the first writing unit 113, and the second memory 103. In the present embodiment, an example in which three packets of data are transmitted will be described. After the data is transmitted to the first writing unit 113, the data is stored in the second memory 103. As illustrated in FIG. 2, first, second, and third packets may be divided and transmitted (scattering transmission) in accordance with functions and settings of the first writing unit 113. After the transmission of all the packets is completed, the first writing unit 113 issues a completion notification to the CPU 101 (S205).

FIGS. 3A to 3C illustrate data stored in the first and second memories 102 and 103 in this processing. FIG. 3A schematically illustrates payload data of the three packets to be transmitted stored in the first memory 102. FIG. 3B schematically illustrates the payload data of the three packets transmitted from the first memory 102 and stored in the second memory 103.

Upon receiving the completion notification, the CPU 101 creates TCP/IP packets in S206 to S214. More specifically, TCP headers and IP headers are created (S206). A checksum field of each TCP header need not be completed and may be "0" data. This is because the first calculation unit 112 performs the checksum calculation. If the second calculation unit 122 can calculate a checksum of each IP header, each IP header field may be "0". In the present embodiment, it is assumed that the CPU 101 creates IP checksums in S206. FIG. 3C illustrates the data storage state of the second memory 103 after the three TCP/IP packets are created (except for TCP checksums). FIG. 3C schematically illustrates the three packets to be transmitted, stored in the second memory 103, in which the IP headers and the TCP headers are added to the payload data. Although the IP headers are completed (except for the IP checksums) in FIG. 3C, the TCP checksum have not been calculated.

Next, the first writing unit 113 makes checksum calculation settings for the second calculation unit 122 of the second transmitter 120 (S207). The checksum calculation settings may be made, in accordance with functions of the second calculation unit 122, using a method in which the size of each packet is specified or by setting information for performing checksum calculation of a pseudo header. If the second calculation unit 122 is capable of performing checksum calculation including an analysis of headers, it may be determined in S207 only whether to establish a through mode or a checksum calculation mode. A case will be described in which the checksum mode is established.

Next, the first writing unit 113 sets copy source information to the second reading unit 121 (S208). More specifically, the first writing unit 113 sets addresses at which the first to third packets are stored and data lengths. Thereafter, the second reading unit 121 reads the three packets of data from the second memory 103 and sends the three packets of data to the second calculation unit 122 (S209). Upon receiving the three packets of data, the second calculation unit 122 calculates the TCP checksums that have not been completed in the received packets and stores the TCP checksums at certain addresses in the packets (S210). The second calculation unit 122 then transmits the complete packets to the interface 106 (S211 to S213). After transmitting the three packets to the interface 106, the second calculation unit 122 issues a completion notification to the CPU 101 (S214). By repeating the same procedure, subsequent packets can be transmitted (S215 to S217).

Although subsequent processing (S215 and later) is performed after S214 in FIG. 2 for the sake of simplicity, S215 may start without waiting for S214 if pipeline processing can be performed. More specifically, the processing in S215 may start after the completion notification is issued in S208. As a result, the transmission of data from the first memory 102 to the second memory 103 performed by the first transmitter 110 and the transmission of data from the second memory 103 to the interface 106 performed by the second transmitter 120 can be performed in parallel with each other. Although the IP headers and the TCP headers of the three packets are created at once in S206, the IP headers and the TCP headers may be created one by one and the second transmitter 120 may transmit the IP headers and the TCP headers one by one, instead. In this case, the transmission of each packet between the first and second memories 102 and 103 and the transmission of each packet from the second memory 103 to the interface 106 can be performed in parallel with each other.

A case in which "checksum OFF" is set to the first transmitter 110 in S201 has been described. If it is difficult to set "checksum OFF" to the first transmitter 110, however, the first calculation unit 112 may perform checksum calculation, instead, and results of the checksum calculation may be neglected. "Checksum OFF", therefore, need not necessarily be set in S201. By not providing the first transmitter 110 with a function of determining whether to perform checksum calculation, for example, the configuration of the first transmitter 110 becomes simpler than when the first transmitter 110 is provided with such a function. The operational flow when TCP/IP packets (not encrypted) are transmitted has been described.

Processing Procedure of Encrypted Communication

Figure 4:
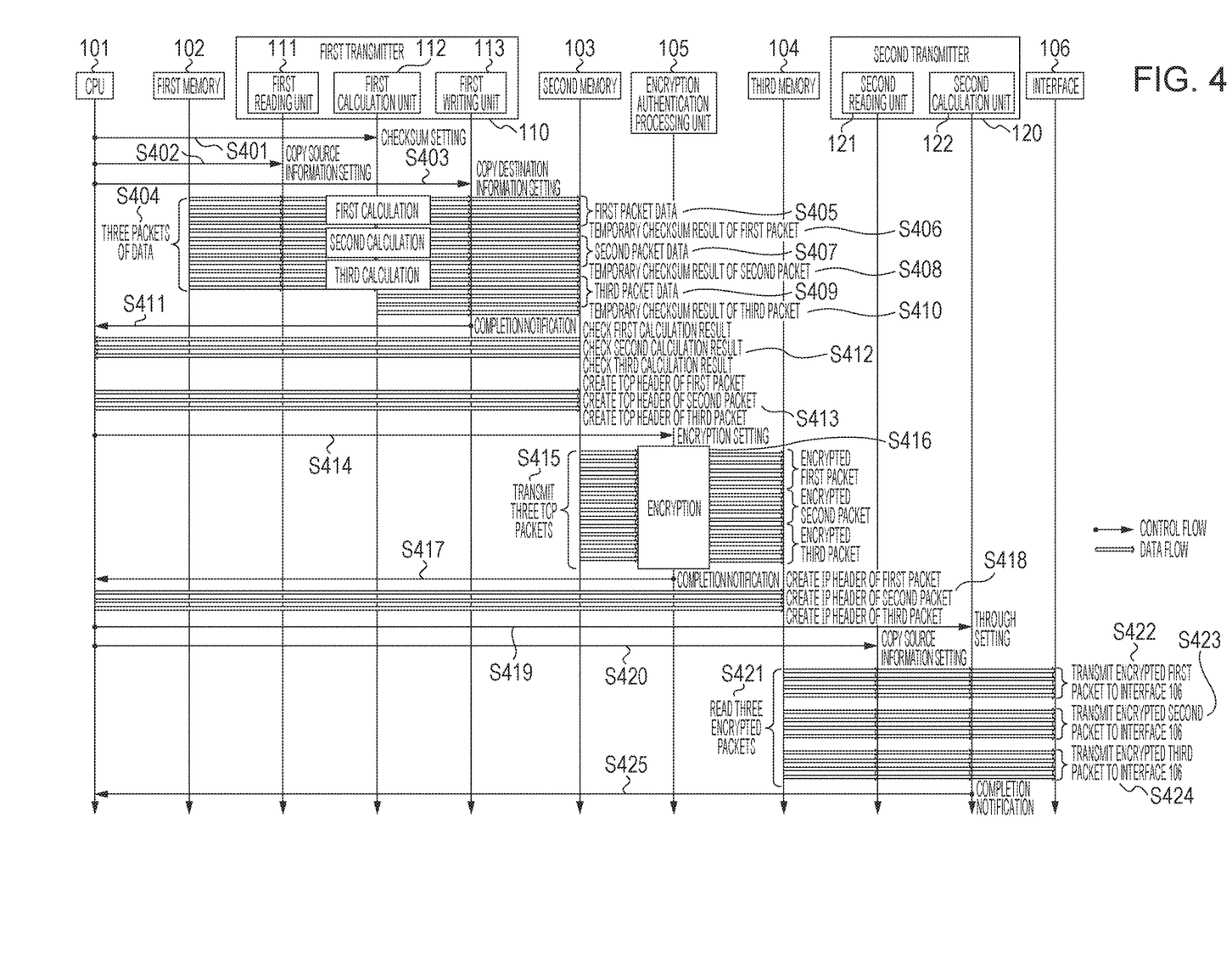
FIG. 4 is a diagram illustrating a process for transmitting TCP/IP packets (encrypted).

Next, an operational flow when TCP/IP packets are transmitted using encryption (e.g., Internet protocol security (IPsec)) will be described with reference to FIG. 4. FIG. 4 is a sequence chart illustrating a processing procedure of encrypted communication. A transport mode employing encapsulating security payload (ESP) will be described as an example. A data storage state of each memory at some steps will be described with reference to FIGS. 5A to 5D. FIGS. 5A to 5D are diagrams illustrating use states of the first to third memories 102 to 104.

First, in S401 to S411, as in the plain text communication described with reference to FIG. 2, the CPU 101 copies a datagram stored in the user buffer in the first memory 102 to the work area secured in the second memory 103. Because a payload length that can be included in each packet is different due to encryption, copy size is different from that in the process illustrated in FIG. 2. Because checksum calculation is to be performed before the second transmitter 120 transmits data, the first transmitter 110 performs the checksum calculation. "Checksum ON" (calculation setting), therefore, is set to the first calculation unit 112 (S401). If the setting is to be made for each packet, a transmission length is set for each of the three packets in an example. Copy source information (here, addresses in the user buffer in the first memory 102 and transmission sizes) is then set to the first reading unit 111 (S402). Copy destination information (here, addresses in the work area in the second memory 103 and the transmission sizes) is then set to the first writing unit 113 (S403). Since the first transmitter 110 also outputs results of the checksum calculation, destinations of the results of the checksum calculation are also set as necessary in accordance with specifications of the first transmitter 110. A case in which the first transmitter 110 outputs the results of the checksum calculation (2 bytes) at ends of the data transmission will be described. That is, a transmission size obtained by adding 2 bytes to the size of each packet is set, and the address of each destination is set. In this case, checksum output addresses need not be particularly specified.

When the setting of the first reading unit 111 has been completed, data transmission from the first memory 102 to the second memory 103 starts (S404). More specifically, in S404, data is sequentially transmitted from the first memory 102 to the first reading unit 111, the first calculation unit 112, the first writing unit 113, and the second memory 103. The data that has reached the first calculation unit 112 is subjected to checksum calculation, and the data and the results of the checksum calculation input to the first writing unit 113 are output. The data and the results of the checksum calculation are stored in the second memory 103 (S405 to S410).

Figure 5A:
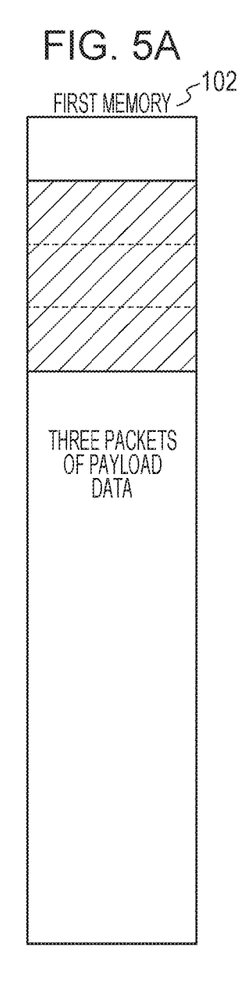
FIGS. 5A to 5D are diagrams illustrating data storage states of each memory in some steps.
Figure 5B:
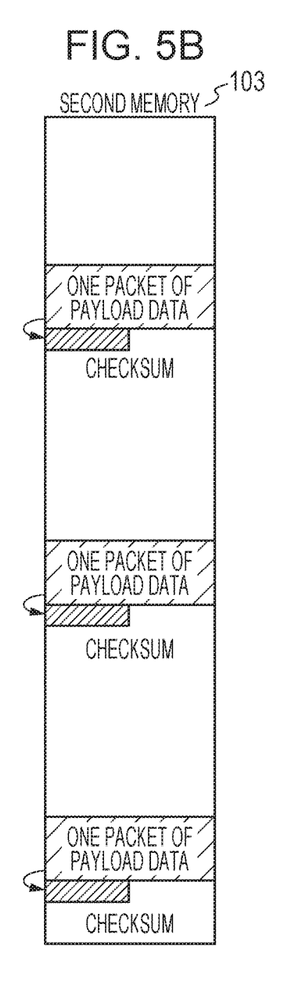

After the transmission of all the packets is completed, the first writing unit 113 issues a completion notification to the CPU 101 (S411). FIGS. 5A and 5B illustrate the data stored in the first memory 102 and the second memory 103 at this time. FIG. 5A schematically illustrates payload data of the three packets to be transmitted stored in the first memory 102. FIG. 5B schematically illustrates the payload data of the three packets stored in the second memory 103 after the first calculation unit 112 calculates checksums. Each checksum stored in the second memory 103 illustrated in FIG. 5B is temporary data obtained by performing checksum calculation on a packet of payload data (does not include a header).

Figure 5C:
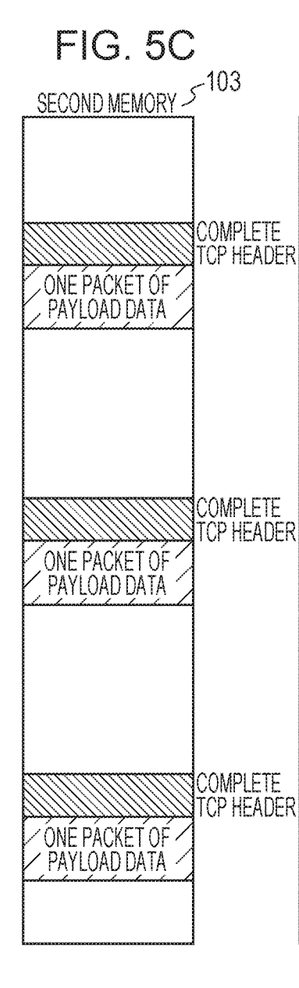

Upon receiving the completion notification, the CPU 101 creates TCP/IP packets in S412 to S418. More specifically, first, first to third results of the checksum calculation are checked (S412), and TCP headers are created (S413). The CPU 101 completes a checksum field of each TCP header using a result of the checksum calculation checked in S412. FIG. 5C illustrates the data stored in the second memory 103 at this time.

After creating the three TCP packets, the CPU 101 makes settings for the encryption authentication processing unit 105 in order to encrypt the TCP packets (S414). After the settings are made in S414, the encryption authentication processing unit 105 performs a process for encrypting and authenticating the three TCP packets stored in the second memory 103 (S415 and S416). The encrypted TCP packets are written back to one of the memories 102 to 104. By registering write-back addresses in the encryption setting (S414), the encrypted TCP packets can be written back at arbitrary addresses. In this example, a case in which the encrypted TCP addresses are written back to the third memory 104 will be described.

Figure 5D:
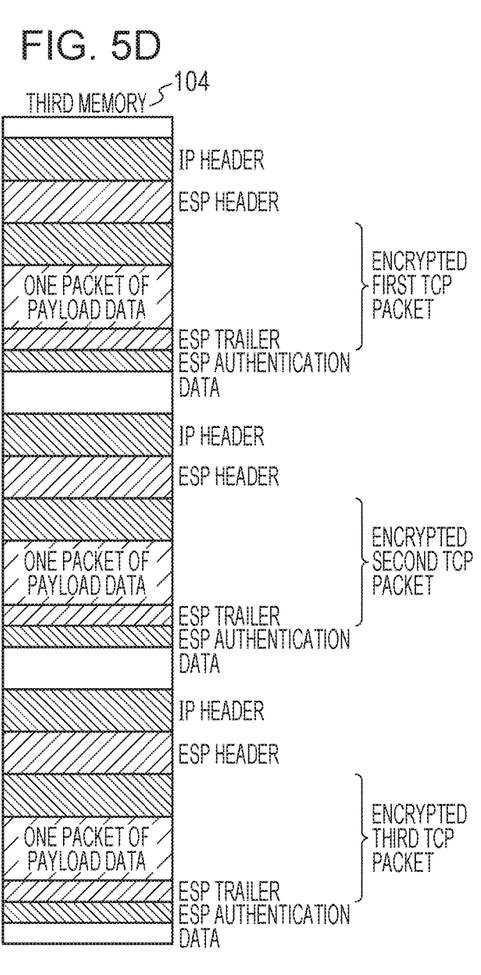

Upon receiving the completion notification of the encryption, the CPU 101 creates IP headers of the first to third packets (S418). FIG. 5D illustrates the data stored in the third memory 104 at this time. As illustrated in FIG. 5D, each TCP packet including a complete TCP header and payload data has been encrypted and converted into an encrypted TCP packet to which an ESP trailer is added. An ESP header, ESP authentication data, and an IP header are added to each encrypted TCP packet.

Thereafter, in S419 to S425, a process for transmitting the encrypted packets to the interface 106 is performed. First, the CPU 101 sets a through mode, in which checksum calculation is not performed, to the second calculation unit 122 included in the second transmitter 120 (S419). This is because the data stored in the third memory 104 is complete packets (except for MAC frames and the like) and checksum calculation need not be performed.

Next, the CPU 101 makes a copy source information setting to the second reading unit 121 (S420). More specifically, the CPU 101 sets addresses at which the first to third packets are stored and data lengths. After the setting is completed, the second reading unit 121 reads the three packets of data from the third memory 104 (S421). The second reading unit 121 transmits the three packets to the interface 106 through the second calculation unit 122 operating in the through mode (S422 to S424). After transmitting the three packets, the second calculation unit 122 issues a completion notification to the CPU 101 (S425). An outline of the operational flow illustrated in FIG. 4 has been described.

The present embodiment is obviously an example, and another processing procedure may be adopted. If the first calculation unit 112 has functions such as header analysis, checksum calculation (including pseudo header processing), and checksum overwriting, for example, a communication process having the following processing procedure can be achieved. That is, first, TCP headers whose checksum fields are not complete are stored in the first memory 102 before the first transmitter 110 begins to operate. The payload (data transmitted in S404) and the TCP headers are then simultaneously transmitted, and complete TCP packets are obtained as a result of the processing performed by the first transmitter 110. Although the IP headers are created after the encryption (S416), the IP headers may be created at any timing or in parallel with another process, instead, insofar as the IP headers can be created before the second transmitter 120 begins to operate. In this case, processing efficiency improves.

As described above, if data is to be subjected to encrypted communication, the CPU 101 causes the first transmitter 110 to read the data from the first memory 102, perform checksum calculation, and transmit the data to the second memory 103. The CPU 101 also causes the encryption authentication processing unit 105 to read the data from the second memory 103, perform encryption on the data, and transmit the data to the third memory 104. Furthermore, the CPU 101 causes the second transmitter 120 to read the data from the third memory 104 and transmit the data to the interface 106. If checksum calculation is to be performed before encryption like this, the CPU 101 can perform the encryption by causing the first transmitter 110 to perform the checksum calculation. In addition, by performing pipeline processing, in which transmission between memories and transmission between a memory and an interface are performed in parallel with each other, efficient processing can be performed regardless of a communication method employed.

Although FIG. 4 illustrates an example in which the processing in S401 and later is performed on subsequent packets after the completion notification is issued in S425, a plurality of types of processing may be performed in parallel with one another as in the plain text communication, instead. For example, the processing becomes efficient by performing the transmission from the first memory 102 to the second memory 103, the encryption by the encryption authentication processing unit 105, and the transmission from the third memory 104 to the interface 106 in parallel with one another. The operational flow when encrypted packets are transmitted has been described.

Processing Procedure of UDP Communication

Figure 6:
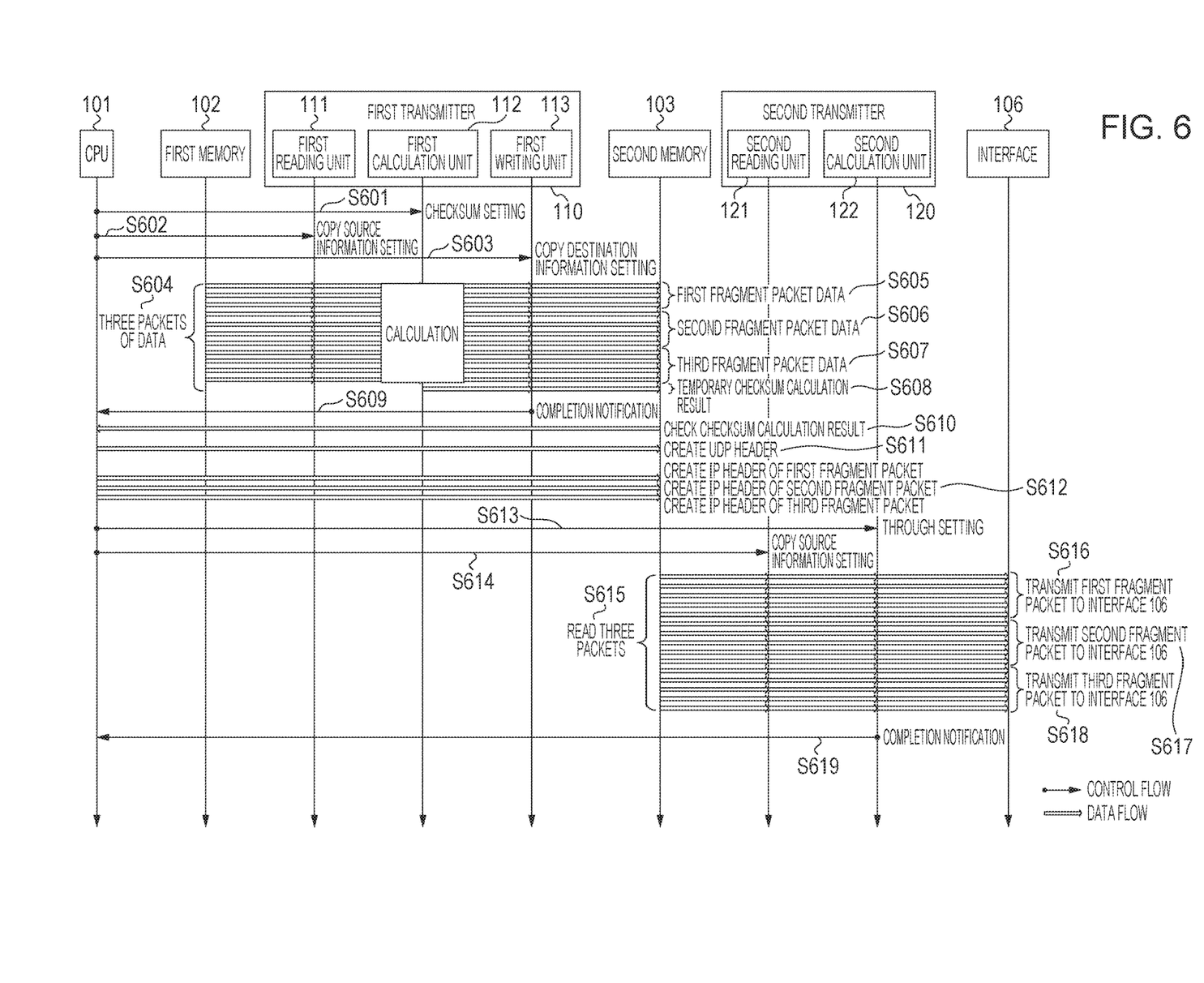
FIG. 6 is a diagram illustrating a process for transmitting user datagram protocol (UDP) packets larger than MTU size.

Next, an operational flow when UDP/IP packets, which are larger than the MTU size in Ethernet (1,500 bytes), are transmitted will be described with reference to FIG. 6. FIG. 6 is a sequence chart illustrating a processing procedure of UDP communication. A data storage state of each memory at some steps will be described with reference to FIGS. 7A to 7D. FIGS. 7A to 7D are diagrams illustrating use states of the first and second memories 102 and 103.

First, in S601 to S609, as in the above two examples, the CPU 101 copies a datagram stored in the user buffer in the first memory 102 to the work area secured in the second memory 103. Because checksum calculation is to be performed before the second transmitter 120 transmits the data, the first transmitter 110 performs the checksum calculation in S604 to S608 when the datagram is copied.

First, the CPU 101 sets "checksum ON" (calculation setting) to the first calculation unit 112 (S601). Here, the checksum setting is made such that data input from the first memory 102 is all subjected to checksum calculation and only one result is output. Copy source information is set to the first reading unit 111 (S602), and copy destination information (here, addresses in the work area in the second memory 103 and transmission sizes) is set to the first writing unit 113 (S603). Because a first one of fragment packets uses a UDP header, the transmission size in S605 is set smaller than the other two transmission sizes (S606 and S607) by 20 bytes, which is the size of the UDP packet. After all the data is input to the first calculation unit 112, the first calculation unit 112 writes a temporary result of the checksum calculation to the second memory 103 (S608).

In the checksum calculation, data is divided into blocks having a certain bit length, and the blocks are added. If carry, in which the bit length of a block is exceeded as a result of the addition of blocks, occurs, 1 bit is added to a lowest bit. Since the checksum calculation is performed in this manner, the checksum calculation can be stopped and resumed while keeping the temporary result insofar as all target blocks are added. In addition, the target blocks can be added in any order. In the calculation performed in S604, therefore, blocks having the certain bit length are read from the input fragment packets and sequentially added to the temporary result of the checksum calculation held in a buffer (not illustrated) in the first calculation unit 112.

Figure 7A:
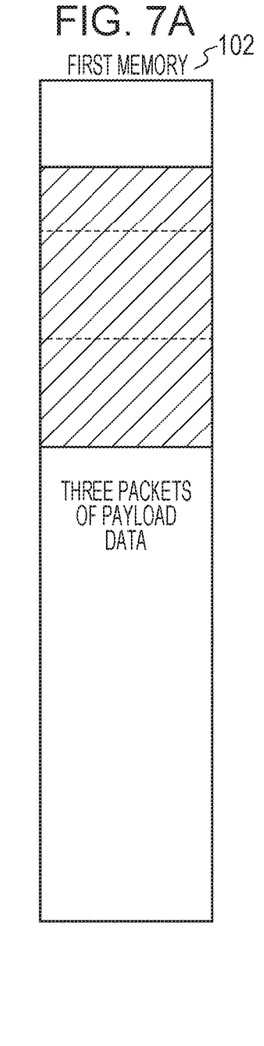
FIGS. 7A to 7D are diagrams illustrating data storage states of each memory in some steps.
Figure 7B:
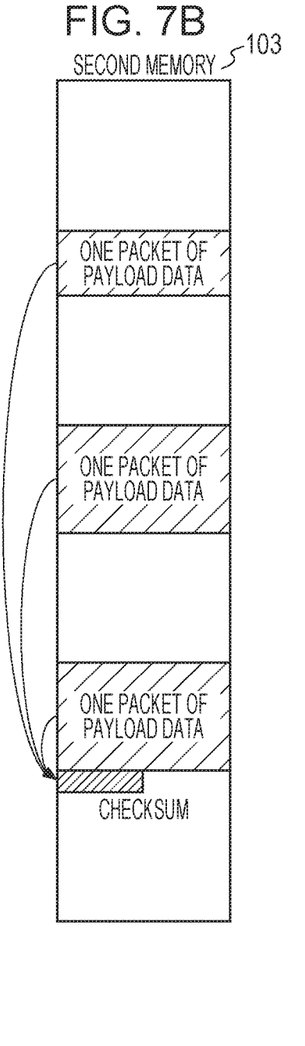

FIGS. 7A and 7B illustrate data storage states of the first and second memories 102 and 103 at this time. FIG. 7A schematically illustrates payload data of the three packets to be transmitted stored in the first memory 102. FIG. 7B schematically illustrates the payload data of the three packets, to which the temporary result of the checksum calculation are added, transmitted from the first memory 102 and stored in the second memory 103.

Although checksum calculation is performed on payload data of each packet in the encrypted communication, a checksum is added only to a first one of the fragment packets including a UDP packet in this example. Only one result of the checksum calculation, therefore, is obtained. The result is a result of the checksum calculation performed on all of first to third pieces of data (S605 to S607).

Figure 7C:
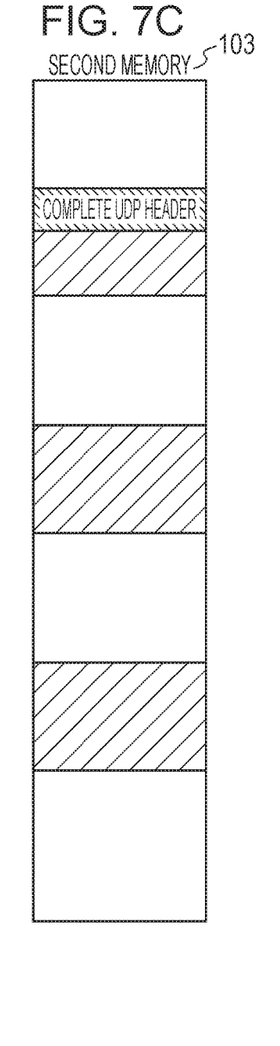
Figure 7D:
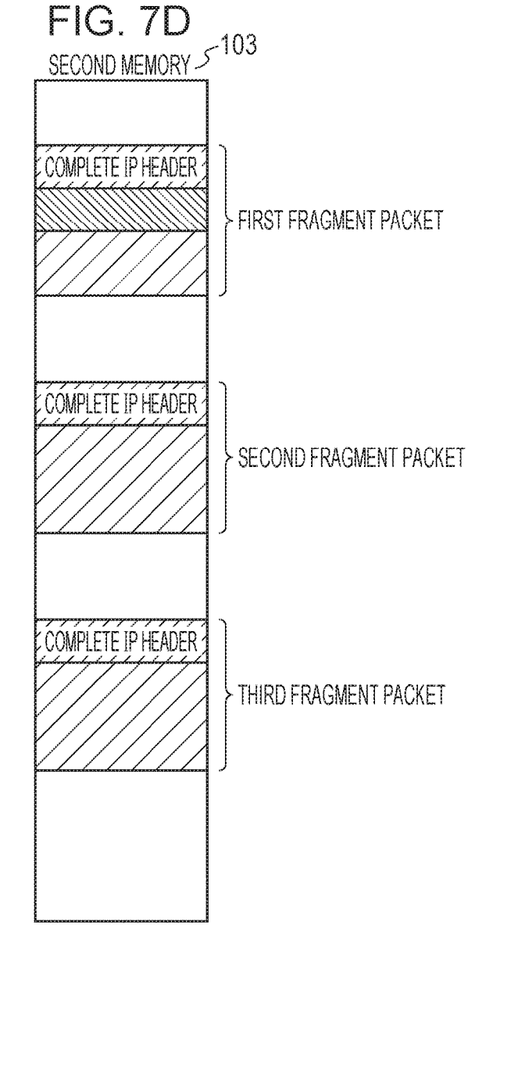

After the result of the checksum calculation is transmitted, the first writing unit 113 issues a completion notification to the CPU 101 (S609). Upon receiving the completion notification, the CPU 101 checks the result of the checksum calculation (S610) and creates a UDP header (S611). At this time, a checksum field included in the UDP header is created using the result of the checksum calculation checked beforehand. FIG. 7C illustrates the data stored in the second memory 103 at a time when the UDP header has been created. The CPU 101 then creates an IP header for each packet (S612). As a result, the fragment packets are completed. FIG. 7D illustrates the fragment packets to which the IP headers are added. The CPU 101 then performs transmission in the same procedure as in the encrypted communication.

As described above, the first transmitter 110 reads data from the first memory 102 and transmits the data to the second memory 103, and the second transmitter 120 reads data from the second memory 103 and transmits the data to the interface 106. If a communication method in which, as in the UDP communication, the size of data is larger than a certain size is employed, the CPU 101 causes the CPU 101 to perform checksum calculation. The first transmitter 110 performs the checksum calculation when transmitting the fragment packets from the first memory 102 to the second memory 103 and adds a result of the checksum calculation to the fragment packets transmitted to the second memory 103. More specifically, the first transmitter 110 holds a temporary result of the checksum calculation and sequentially adds blocks having the certain bit length included in each fragment packet when transmitting the fragment packet. After transmitting all fragment packets included in a UDP packet, the first transmitter 110 outputs a result of checksum calculation corresponding to the UDP packet to the second memory 103. The first transmitter 110 thus does not collectively output a UDP packet to which a result of checksum calculation is added but performs the addition process in parallel with the transmission of the fragment packets and separately outputs payload data and the result of the checksum calculation. As a result, checksum calculation can be efficiently performed on packets larger than the MTU size without a large buffer provided for the first transmitter 110.

Although FIG. 6 illustrates an example in which the processing in S601 and later is performed on subsequent packets after the completion notification is issued in S619, a plurality of types of the processing may be performed in parallel with each other as in the plain text communication and the encrypted communication, instead. For example, by performing the transmission from the first memory 102 to the first calculation unit 112 and the transmission from the second memory 103 to the interface 106 in parallel with each other, the processing can be efficiently performed. The processing procedure of the checksum calculation when packets larger than the MTU size are transmitted has been described.

The three cases of transmission have been described, namely:
(1) TCP/IP (not encrypted) transmission;
(2) TCP/IP (encrypted) transmission; and
(3) UDP (not encrypted) transmission of packets larger than the MTU size.

Each case can be achieved using the first calculation unit 112 whose functions are simpler than those of the second calculation unit 122. By "simpler", it is meant that part or all of the following functions are not included:
(1) a function of calculating a pseudo header;
(2) a function of overwriting a checksum; and
(3) a function of buffering packets.
The first calculation unit 112, therefore, need not necessarily have such functions, which are performed by the second calculation unit 122. If it is desirable to include a calculation unit in each transmitter but gate size is to be small, therefore, the first calculation unit 112 may have fewer functions than the second calculation unit 122.

As described above, the communication apparatus according to the present embodiment includes a plurality of memories and performs a plurality of types of processing in parallel with one another through pipeline processing by performing the checksum calculation, the encryption and authentication process, and the like while transmitting data between the plurality of memories. In the present embodiment, the CPU 101 determines a transmitter to perform the checksum calculation in accordance with a communication method employed, that is, in accordance with whether to perform TCP or UDP communication or whether to perform encryption. By selecting the transmitter to perform checksum calculation in accordance with the communication method employed, the checksum calculation can be efficiently performed in various communication methods.

Although a case in which the communication apparatus 001 performs checksum calculation on data to be transmitted has been described in the present embodiment, a calculation device such as a dedicated logical circuit may have the above-described configuration and may be incorporated into a communication apparatus, instead. In this case, for example, the calculation device may include a plurality of memories, an interface, first and second transmitters that transmit data between memories and between a memory and the interface, respectively, and a control unit (a CPU or the like) that controls the operation of the first and second transmitters. The control unit may cause the first or second transmitter to perform checksum calculation on the basis of a communication method employed for data. As a result, the checksum calculation can be efficiently performed in various communication methods because of parallel processing based on pipeline processing.

Second Embodiment

In the first embodiment, a configuration in which the transmitters (the first transmitter 110 and the second transmitter 120) each include a calculation unit has been described. In an aspect of a second embodiment, a communication apparatus 002, in which two transmitters share one calculation unit, will be described with reference to FIG. 8.

Figure 8:
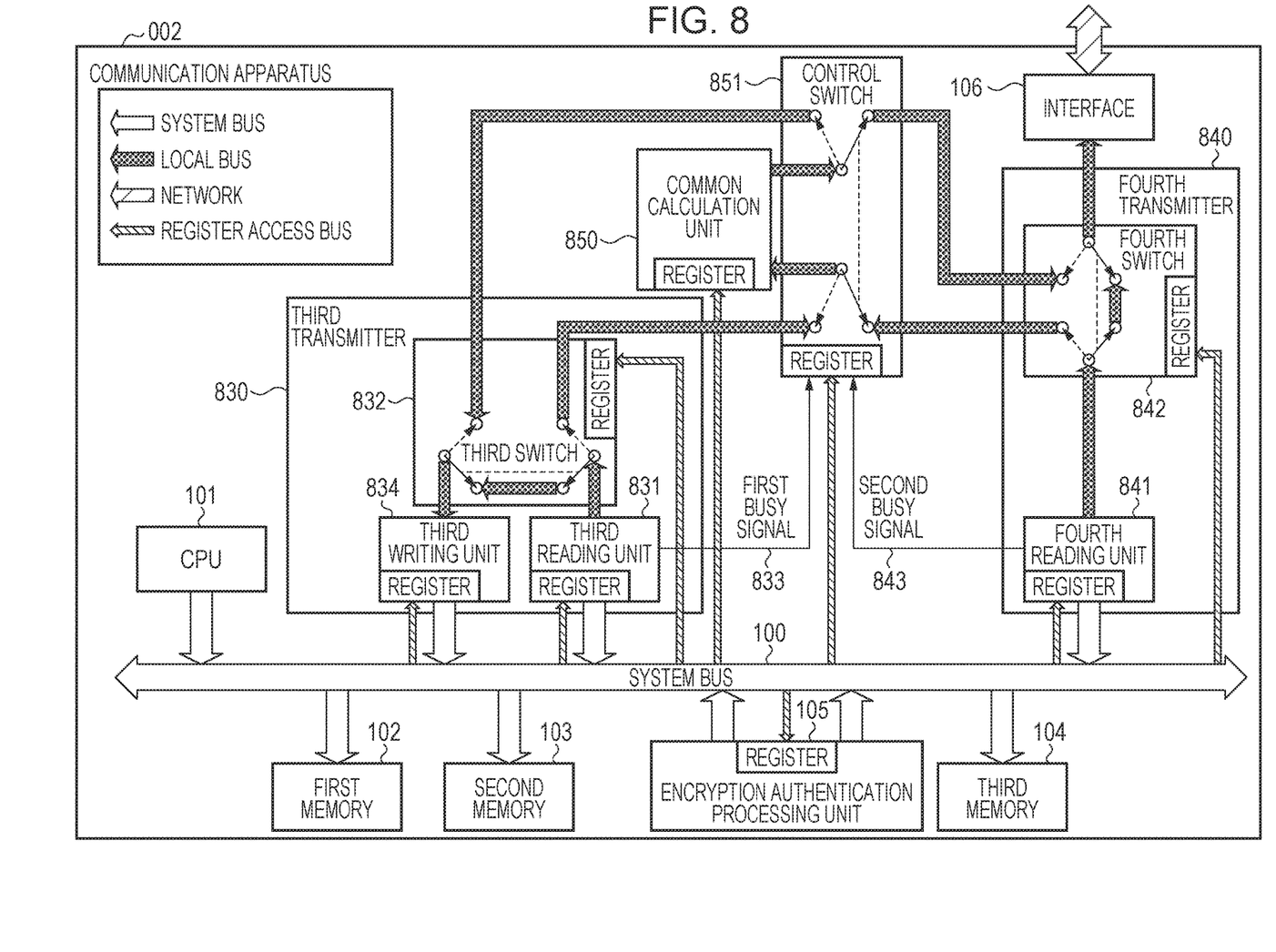
FIG. 8 is a block diagram illustrating the configuration of a communication apparatus.

A CPU 101, first to third memories 102 to 104, an encryption authentication processing unit 105, a system bus 100, and an interface 106 are the same as those according to the first embodiment. A third transmitter 830 is capable of transmitting data between the first to third memories 102 to 104 and is a module corresponding to the first transmitter 110 according to the first embodiment. Whether to perform checksum calculation can be selected when data is transmitted between the first to third memories 102 to 104. The selection is performed using a third switch 832. If checksum calculation is not to be performed, the third switch 832 is operated such that data output from a third reading unit 831 is directly input to a third writing unit 834. If checksum calculation is to be performed, the following operation is performed. That is, the third switch 832 is operated such that data output from the third reading unit 831 is temporarily input to a common calculation unit 850 and data output from the common calculation unit 850 is input to the third writing unit 834.

A fourth transmitter 840 is capable of transmitting data between one of the first to third memories 102 to 104 and the interface 106 and is a module corresponding to the second transmitter 120 according to the first embodiment. As in the case of the third transmitter 830, whether to perform checksum calculation can be selected by operating a fourth switch 842 when data is transmitted between one of the first to third memories 102 to 104 and the interface 106. The common calculation unit 850 is commonly used by the third transmitter 830 and the fourth transmitter 840. A control switch 851, a first busy signal 833 output from the third reading unit 831, and a second busy signal 843 output from a fourth reading unit 841 are used for switching the common calculation unit 850 between the third transmitter 830 and the fourth transmitter 840. That is, the common calculation unit 850 is configured such that when either the third transmitter 830 or the fourth transmitter 840 is using the common calculation unit 850, the common calculation unit 850 does not receive an input from the other transmitter.

Since only one calculation unit is used in the communication apparatus 002 according to the present embodiment, the gate size is smaller than that of the communication apparatus 001. The third transmitter 830 and the fourth transmitter 840, however, do not perform checksum calculation while transmitting data. The communication apparatus 002, therefore, may be desirable in a system in which such a case does not occur or that tolerates deterioration in communication speed when such a case occurs. The communication apparatus 002 has been described.

As in the first embodiment, a calculation device such as a dedicated logic circuit may have the above-described configuration and incorporated into a communication apparatus, instead. The processing procedure according to one of the above embodiments may be described as a computer program using a certain hardware design language, and a computer (an information processing device such as a built-in device or a general-purpose device (a personal computer (PC))) may read and execute the computer program.

As described above, according to an aspect of the embodiments, when packets larger than the MTU size are transmitted, checksum calculation can be efficiently performed without a large buffer provided for a transmitter while performing another process. Furthermore, in encrypted communication, too, checksum calculation can be efficiently performed while performing another process. Efficient checksum calculation, therefore, can be performed in various communication methods.

Other Embodiments

An aspect of the embodiments can be implemented in a mode in which a program that achieves one or more functions according to the above embodiments is supplied to a system or an apparatus through a network or a storage medium and one or more processors in a computer of the system or the apparatus read and execute the program. An aspect of the embodiments can also be implemented by a circuit (e.g., an application-specific integrated circuit (ASIC)) that achieves one or more functions according to the above embodiments.

An aspect of the embodiments provides a technique for efficiently performing checksum calculation in various communication methods.

An aspect of the embodiments can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While an aspect of the embodiments has been described with reference to exemplary embodiments, it is to be understood that the aspect of the embodiments is not limited to the disclosed exemplary embodiments. The scope of the following claims is to be accorded the broadest interpretation so as to encompass all such modifications and equivalent structures and functions.

This application claims the benefit of Japanese Patent Application No. 2015-242644, filed Dec. 11, 2015, which is hereby incorporated by reference herein in its entirety.

What is claimed is:

1. A calculation device comprising:
   one or more processors;
   a plurality of memories including a first memory and a second memory;
   a communication interface configured to output a packet to which a checksum is added;
   a first DMAC (direct memory access controller) configured to transmit data from the first memory to the second memory and having a function of performing checksum calculation on the transmitted data; and
   a second DMAC configured to transmit data from at least one of the plurality of memories to the communication interface and having a function of performing checksum calculation on the transmitted data,
   wherein one or more memories include instructions that, when executed by the one or more processors, cause the calculation device to:
   1) in a case where Internet Protocol Security (IPSec) is not used for the packet, transmit data stored in the first memory to the second memory by using the first DMAC without performing the checksum calculation; and transmit, to the communication interface, the data transmitted to the second memory and a header generated by at least one of the one or more processors, with performing the checksum calculation for the checksum to be added to the packet, by using the second DMAC;

2) in a case where Internet Protocol Security (IPSec) is used for the packet, transmit data stored in the first memory to the second memory by using the first DMAC with performing the checksum calculation; and based on a result of the checksum calculation and a header generated by at least one of the one or more processors, perform checksum calculation by the at least one of the one or more processors for the checksum to be added to the packet; and transmit encrypted data generated by encrypting the data stored in the second memory and the calculated checksum to the communication interface, by using the second DMAC, without performing the checksum calculation.

2. The calculation device according to claim 1, wherein transmission by the first DMAC and transmission by the second DMAC are performed in parallel.

3. A calculation method used by a calculation device including one or more processors, a plurality of memories including a first memory and a second memory, a communication interface configured to output a packet to which a checksum is added, a first DMAC (direct memory access controller) configured to transmit data from the first memory to the second memory and having a function of performing checksum calculation on the transmitted data and a second DMAC configured to transmit from at least one of the plurality of memories to the communication interface and having a function of performing checksum calculation on the transmitted data, the calculation method comprising:

1) in a case where Internet Protocol Security (IPSec) is not used for the packet, transmitting data stored in the first memory to the second memory by using the first DMAC without performing the checksum calculation; and transmitting, to the communication interface, the data transmitted to the second memory and a header generated by at least one of the one or more processors, with performing the checksum calculation for the checksum to be added to the packet, by using the second DMAC;

2) in a case where Internet Protocol Security (IPSec) is used for the packet, transmitting data stored in the first memory to the second memory by using the first DMAC with performing the checksum calculation; and based on a result of the checksum calculation and a header generated by at least one of the one or more processors, performing checksum calculation by the at least one of the one or more processors for the checksum to be added to the packet; and transmitting encrypted data generated by encrypting the data stored in the second memory and the calculated checksum to the communication interface, by using the second DMAC, without performing the checksum calculation.

4. A non-transitory computer-readable storage medium storing a computer program for causing a computer to perform a calculation method used by a calculation device including one or more processors, a plurality of memories including a first memory and a second memory, a communication interface configured to output a packet to which a checksum is added, a first DMAC (direct memory access controller) configured to transmit data from the first memory to the second memory and having a function of performing checksum calculation on the transmitted data, and a second DMAC configured to have a checksum calculation function of transmitting data from at least one of the plurality of memories to the communication interface, the calculation method comprising:

1) in a case where Internet Protocol Security (IPSec) is not used for the packet, transmitting data stored in the first memory to the second memory by using the first DMAC without performing the checksum calculation; and transmitting, to the communication interface, the data transmitted to the second memory and a header generated by at least one of the one or more processors, with performing the checksum calculation for the checksum to be added to the packet, by using the second DMAC;

2) in a case where Internet Protocol Security (IPSec) is used for the packet, transmitting data stored in the first memory to the second memory by using the first DMAC with performing the checksum calculation; and based on a result of the checksum calculation and a header generated by at least one of the one or more processors, performing checksum calculation by the at least one of the one or more processors for the checksum to be added to the packet; and transmitting encrypted data generated by encrypting the data stored in the second memory and the calculated checksum to the communication interface, by using the second DMAC, without performing the checksum calculation.

\* \* \* \* \*